(12) United States Patent
Van Der Brink

(10) Patent No.: US 8,919,800 B1
(45) Date of Patent: Dec. 30, 2014

(54) AGRICULTURAL IMPLEMENT TRANSPORTING TRAILER

(71) Applicant: Kyle Van Der Brink, Rock Valley, IA (US)

(72) Inventor: Kyle Van Der Brink, Rock Valley, IA (US)

(73) Assignee: Kooima Company, Rock Valley, IA (US)

( * ) Notice: Subject to any disclaimer, the term of this patent is extended or adjusted under 35 U.S.C. 154(b) by 37 days.

(21) Appl. No.: 13/733,381

(22) Filed: Jan. 3, 2013

(51) Int. Cl.
*B62D 21/14* (2006.01)
*A01D 75/00* (2006.01)

(52) U.S. Cl.
CPC .................................. *A01D 75/008* (2013.01)
USPC ...................... 280/400; 280/490.1; 280/476.1

(58) Field of Classification Search
USPC .................................... 280/400, 490.1, 476.1
See application file for complete search history.

(56) References Cited

U.S. PATENT DOCUMENTS

| | | | | |
|---|---|---|---|---|
| 2,389,211 A * | 11/1945 | Pointer | ......................... | 414/481 |
| 2,952,476 A * | 9/1960 | Brockman | ................. | 280/425.2 |
| 2,953,396 A * | 9/1960 | Meadows | .................. | 280/441.2 |
| 2,969,989 A * | 1/1961 | Struthers | .................... | 280/43.11 |
| 3,041,087 A * | 6/1962 | Talbert | ....................... | 280/425.2 |
| 3,066,954 A * | 12/1962 | Brockman | ................. | 280/441.2 |
| 3,147,024 A * | 9/1964 | Brockman | .................. | 280/81.1 |
| 3,179,271 A * | 4/1965 | Donahue | ....................... | 414/495 |
| 3,232,464 A * | 2/1966 | Bogh et al. | .................... | 414/495 |
| 3,326,572 A * | 6/1967 | Murray | ...................... | 280/441.2 |
| 3,339,942 A * | 9/1967 | Ratkovich | .................. | 280/476.1 |
| 3,450,283 A * | 6/1969 | Helland | ......................... | 414/474 |
| 3,497,232 A * | 2/1970 | Richey | ......................... | 280/43.11 |
| 3,517,944 A * | 6/1970 | Otto | ............................ | 280/414.5 |
| 3,811,697 A * | 5/1974 | Armstrong | ................. | 280/43.18 |
| 3,866,935 A * | 2/1975 | Nelson | ......................... | 280/43.23 |
| 3,910,436 A * | 10/1975 | Machan | ......................... | 414/495 |
| 4,063,745 A * | 12/1977 | Olson | .......................... | 280/43.23 |
| 4,083,573 A * | 4/1978 | Baxter | ......................... | 280/43.11 |
| 4,093,266 A * | 6/1978 | Baxter | ......................... | 280/491.1 |
| 4,109,811 A * | 8/1978 | Stucky | .......................... | 414/495 |
| 4,318,656 A * | 3/1982 | Ezell | ............................ | 414/471 |
| 4,362,317 A * | 12/1982 | Brockman | .................... | 280/656 |
| 4,400,005 A * | 8/1983 | Losh | ........................... | 280/441.2 |
| 5,937,963 A * | 8/1999 | Urbanczyk | .................... | 180/208 |

(Continued)

OTHER PUBLICATIONS

"Frontier Header Transports", Frontier Equipment, brochure, 6 pages, copyright 2009.

(Continued)

*Primary Examiner* — Kevin Hurley
*Assistant Examiner* — Michael Stabley
(74) *Attorney, Agent, or Firm* — Jeffrey A. Proehl; Woods, Fuller, Shultz & Smith, P.C.

(57) ABSTRACT

An implement transporting trailer for supporting a harvesting implement may comprise a central portion with a longitudinal spine with an uppermost support surface and a plurality of lateral members extending laterally from the spine, each of the lateral members having an uppermost support surface. The trailer may include a rearward portion with a rear frame and at least one rear wheel rotating about a rear wheel axis. The trailer may include a forward portion with a neck assembly extending forwardly from the spine of the central portion and a tongue assembly mounted on the neck assembly and being swivelable with respect to the neck assembly. At least one of the support surfaces of the members of the central portion may be located at a vertical level above a ground surface that is lower than the rear wheel axis.

19 Claims, 5 Drawing Sheets

(56) References Cited

U.S. PATENT DOCUMENTS

| | | | |
|---|---|---|---|
| 6,986,519 B2* | 1/2006 | Smith | 280/124.128 |
| 7,243,979 B1* | 7/2007 | Stene et al. | 296/168 |
| 8,132,999 B2* | 3/2012 | Lundin | 414/495 |
| 8,317,452 B2* | 11/2012 | Lundin | 414/482 |
| 2005/0002767 A1* | 1/2005 | Oosterhouse | 414/498 |
| 2009/0250901 A1* | 10/2009 | Lundin | 280/442 |

OTHER PUBLICATIONS

"Unverferth Header Transports", Unverferth Manufacturing Company, Inc., brochure, 6 pages, copyright 2010.

* cited by examiner

AGRICULTURAL IMPLEMENT TRANSPORTING TRAILER

BACKGROUND

Field

The present disclosure relates to transport trailers and more particularly pertains to a new agricultural implement transporting trailer for facilitating transport of agricultural implements.

SUMMARY

In one aspect, the present disclosure relates to an implement transporting trailer for supporting a harvesting implement, with the trailer having a front and a rear and opposite lateral sides. The trailer may comprise a central portion for supporting the harvesting implement, with the central portion including a longitudinal spine with an uppermost support surface and a plurality of lateral members mounted on and extending laterally from the spine. Each of the lateral members may have an uppermost support surface. The trailer may also comprise a rearward portion extending rearwardly from the central portion, with the rearward portion including a rear frame extending rearwardly from the spine and at least one rear wheel being mounted on the rear frame. The at least one rear wheel may rotate about a rear wheel axis. The trailer may also comprise a forward portion extending forwardly from the central portion and configured to hitch to a towing vehicle, with the forward portion including a neck assembly extending forwardly from the spine of the central portion and a tongue assembly mounted on the neck assembly and being swivelable with respect to the neck assembly. The tongue assembly may include at least one front wheel and a tongue member pivotable to permit movement in a substantially vertical plane. At least one of the uppermost support surfaces of the members of the central portion may be located at a vertical level above a ground surface that is lower than the rear wheel axis when the trailer is towable on the road.

In another aspect, the present disclosure relates to an implement transporting trailer for supporting a harvesting implement, with the trailer having a front and a rear and opposite lateral sides. The trailer may comprise a central portion for supporting the harvesting implement, with the central portion including a longitudinal spine with an uppermost support surface and a plurality of lateral members mounted on and extending laterally from the spine. Each of the lateral members may have an uppermost support surface. The trailer may also comprise a rearward portion extending rearwardly from the central portion, with the rearward portion including a rear frame extending rearwardly from the spine. The rearward portion may also comprise at least one rear wheel mounted on the rear frame, with the at least one rear wheel rotating about a rear wheel axis. The trailer may comprise a forward portion extending forwardly from the central portion and configured to hitch to a towing vehicle. The forward portion may include a neck assembly extending forwardly from the spine of the central portion and a tongue assembly mounted on the neck assembly and being swivelable with respect to the neck assembly. The tongue assembly may include at least one front wheel and a tongue member pivotable to permit movement in a substantially vertical plane. At least one of the uppermost support surfaces of the members of the central portion may be maintained at a vertical level above a ground surface that is lower than the rear wheel axis for loading the trailer and for towing the trailer.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood when consideration is given to the drawings and the detailed description which follows. Such description makes reference to the annexed drawings wherein.

DETAILED DESCRIPTION

Figure 1:
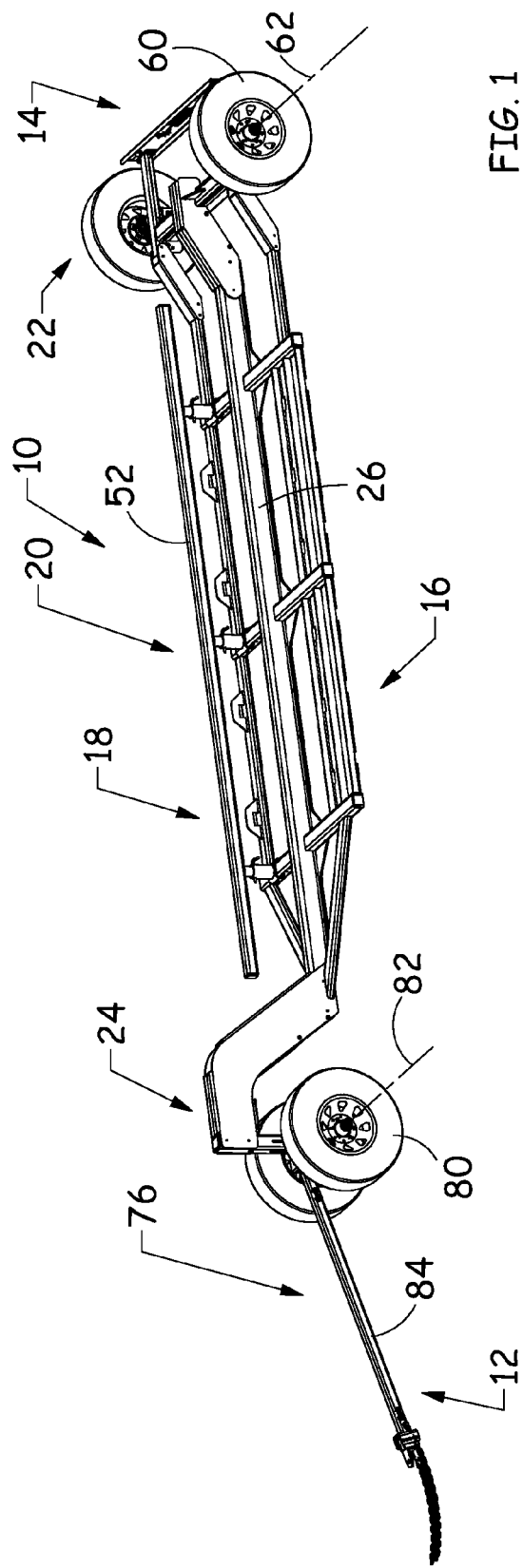
FIG. 1 is a schematic perspective view of a new agricultural implement transporting trailer according to the present disclosure.
Figure 2:
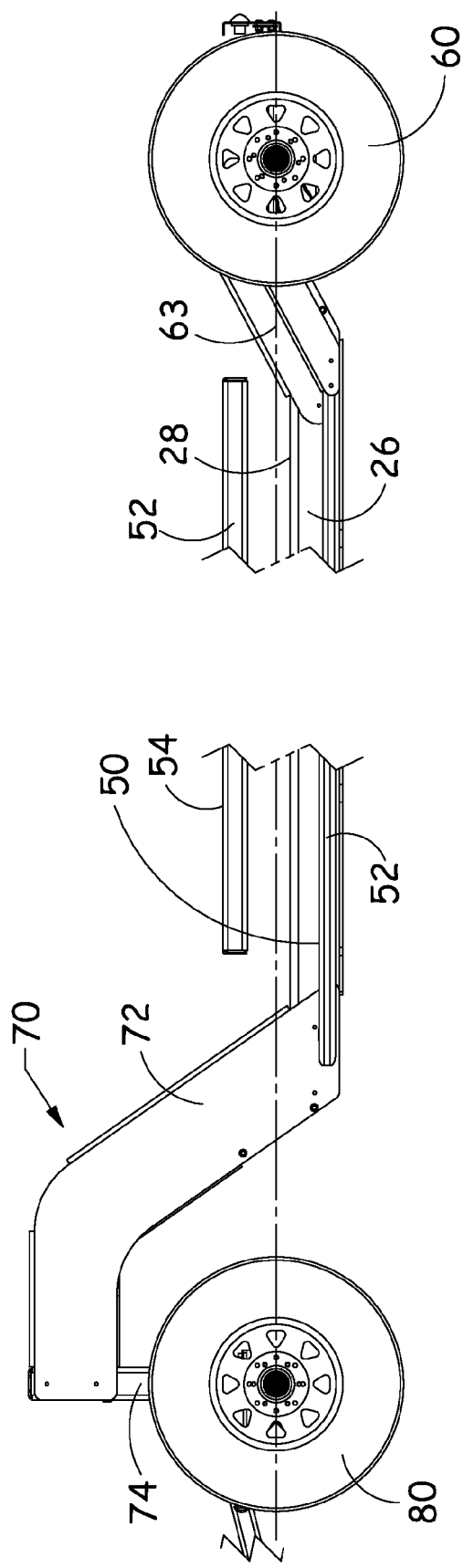
FIG. 2 is a schematic side view of the trailer with sections broken away, according to an illustrative embodiment.
Figure 3:
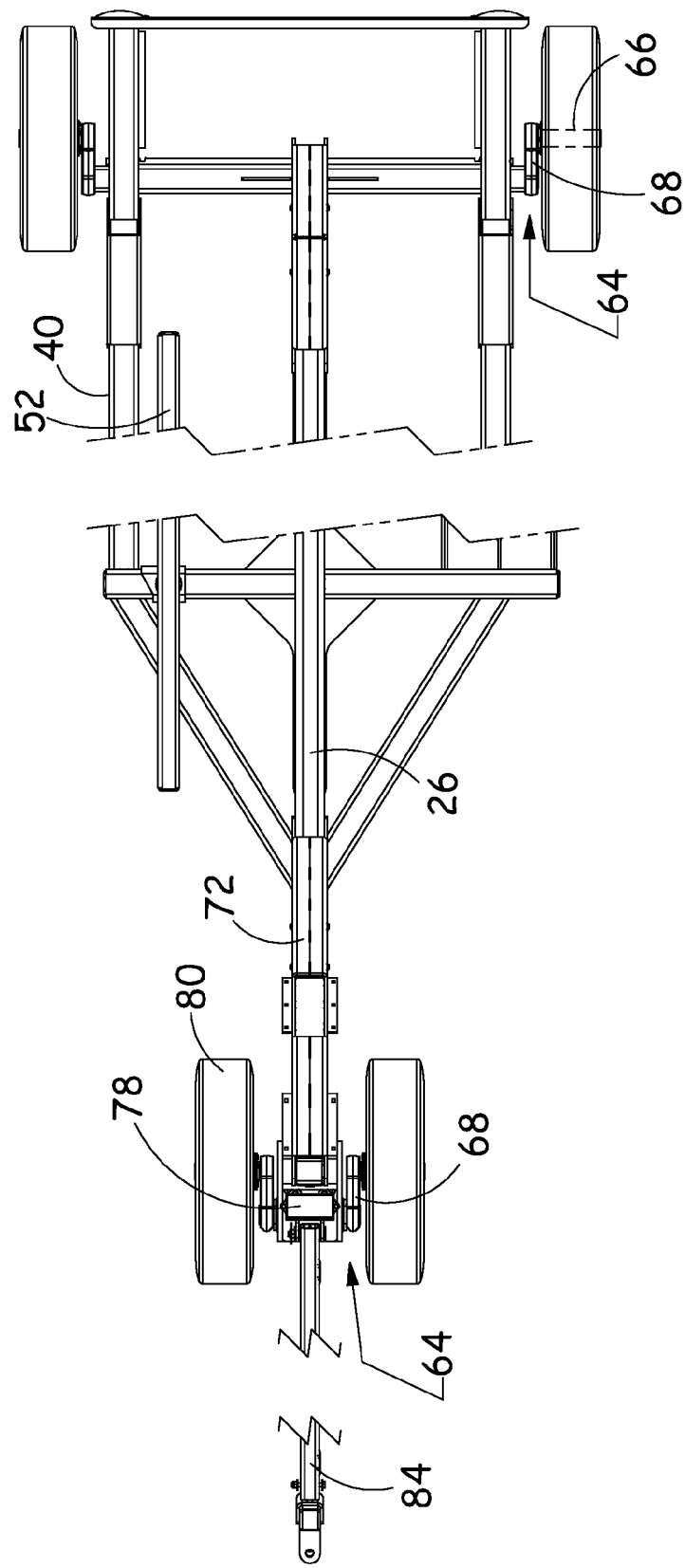
FIG. 3 is a schematic top view of the trailer with sections broken away, according to an illustrative embodiment.
Figure 4:
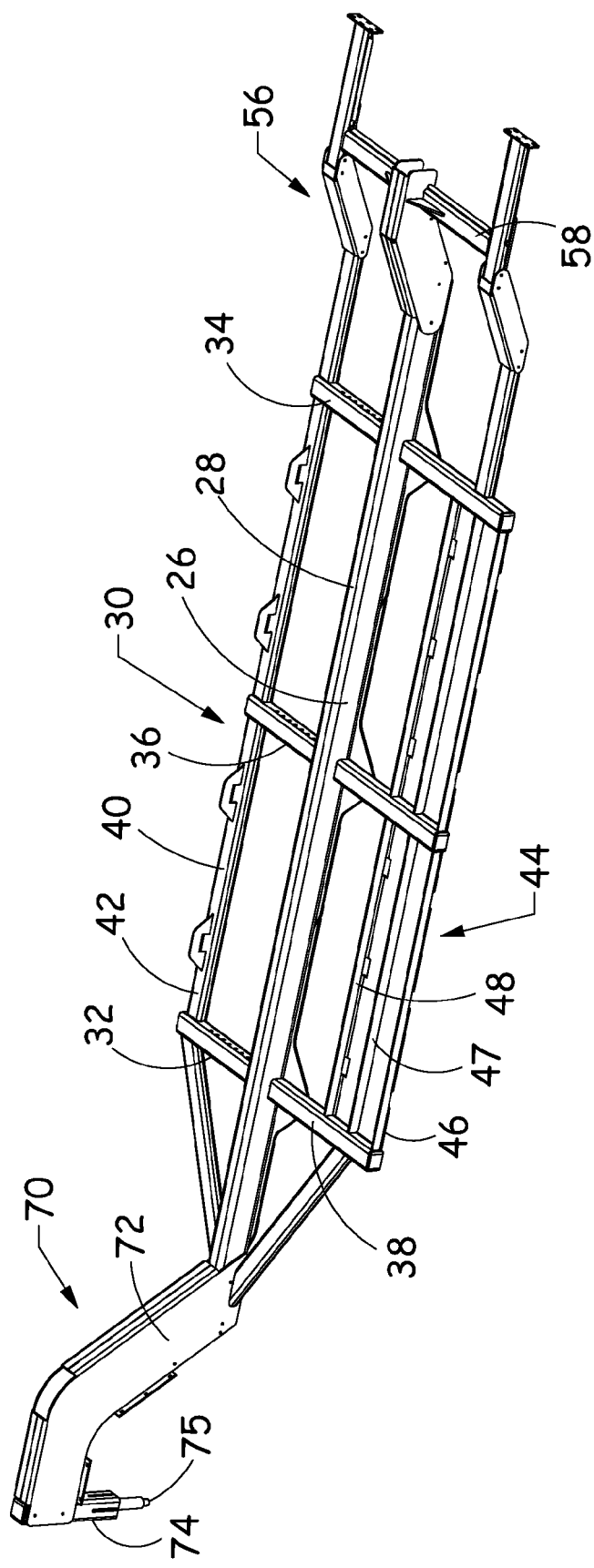
FIG. 4 is a schematic perspective view of the trailer with elements removed to show details of the trailer.
Figure 5:
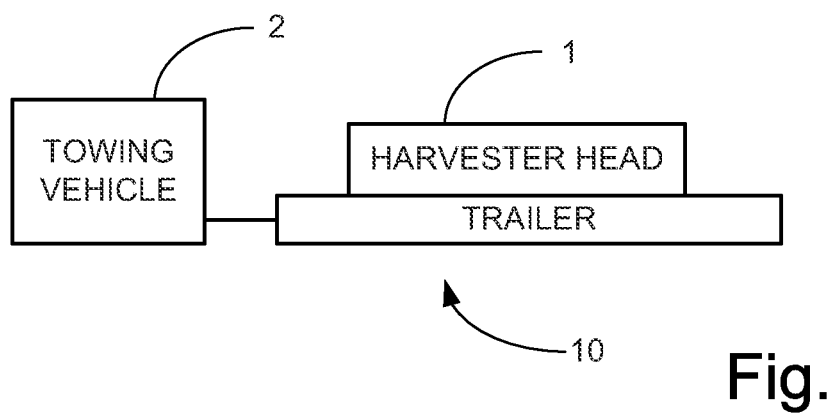
FIG. 5 is a schematic diagram of the trailer in use with a towing vehicle and harvester head.

With reference now to the drawings, and in particular to FIGS. 1 through 5 thereof, a new agricultural implement transporting trailer embodying the principles and concepts of the disclosed subject matter will be described.

Applicant has recognized that conventional trailers intended to transport implements, such as agricultural harvester heads, while suitable for corn harvester heads are not really well suited for transporting forage harvester heads. The conventional trailers are able to carry both types of heads, but problems arise in attempting to load and unload the forage harvester heads on the trailers. While the bed height on the conventional trailers is easily within the lifting ability and range of the typical corn harvester or combine, a forage harvester is typically unable to lift the attached harvester head as high, and as a result the forage head may have to be lifted onto the conventional trailers using means other than the harvester alone.

Applicant has further recognized that a trailer that includes support surfaces that are positioned relatively lower than the conventional trailers will help to solve this usability problem and provide a more useful trailer that may be used with combine heads as well as the forage harvester heads, thus providing a more versatile trailer. Applicant has also recognized that trailers that are designed to carry the long corn heads necessarily have to carry the head over the rear wheels of the trailer in order for the trailer to be of practical length, but this design requires that the entire head be supported at a height that clears the axles and even the wheels in some cases.

The disclosure generally relates to an implement transporting trailer 10 for supporting a harvesting implement 1 while being towed by a towing vehicle 2. The trailer generally has a front 12 and a rear 14 and opposite lateral sides 16, 18. The trailer 10 is generally intended to be pulled or towed in the forward direction over the road as well as in the field to bring the trailer closer to the harvester in the field.

In general, the trailer may comprise a central portion 20, a rearward portion 22 located toward the rear 14 of the trailer, and a forward portion 24 located toward the front 12 of the trailer. The central portion 22 may provide the structure on which the harvester head rests during transport, and may be suitably positioned relatively to the ground surface below the trailer to perform this function. In some of the most preferred embodiments, the longitudinal length of the central portion is large enough so that the harvester head, when supported by the trailer, does not extend beyond the central portion to the forward or rearward portions. The forward 24 and rearward 22 portions may support the central portion on the ground in a position that is spaced about the ground surface to some degree. The forward portion 24 may also provide some degree of steering for the trailer to enhance maneuverability.

In greater detail, the central portion 20 may include a spine 26 which may extending generally longitudinally between the rearward 22 and forward 24 portions of the trailer. The spine 26 may be positioned generally centrally in a lateral direction of the trailer, and may have an uppermost support surface 28. The central portion may also include a plurality of lateral members 30 that generally radiate outwardly with respect to the spine 26, and may be mounted on and extend laterally outwardly from the spine. In some embodiments, a pair of forward lateral members 32 may be positioned on the spine 26 toward the front of the trailer, a pair of rearward lateral members 34 may be positioned on the spine toward the rear of the trailer, and a pair of central lateral members 36 may be positioned toward a center of the trailer between the forward 32 and rearward 34 lateral members. More or fewer lateral support members may be employed. Each of the lateral members 30 may have an uppermost support surface 38.

The central portion may also include at least one primary side member 40 that is positioned laterally of the spine and extends generally longitudinally and parallel to the spine 26. The primary side member 40 having an uppermost support surface 42. In some embodiments of the trailer, additional side members may form an area of denser support, such as a support tray 44, which is positioned laterally to the spine, such as opposite of the primary side member 40, and may be spaced from the spine. The support tray may be formed by a plurality of relatively smaller secondary side members 46, 47, and 48. The secondary side members may be generally aligned with the spine, and the smaller relative size of the secondary side members may provide uppermost support surfaces 50 that are relatively closer to the ground surface to facilitate the loading of heads from harvesters that are limited in the height that the head may be lifted.

The central portion 20 may also include an auxiliary support bar 52 that may be oriented generally parallel to the spine. The auxiliary support bar 52 may have an uppermost support surface 54 on which a portion of a harvester head may be rested. In some embodiments, the auxiliary support bar 52 may be mounted on at least two of the lateral support members 30 such that a lateral distance between the uppermost support surface 54 of the support bar and the spine 26 is adjustable. The auxiliary support bar 52 may also be adjustable such that a vertical height of the uppermost support surface 54 of the support bar is also adjustable. The position of the support bar 52, and its support surface 54, may thus be adjusted to fit the particular head being transported as needed.

The rearward portion 22 of the trailer 10 may extend rearwardly from the central portion 20. In some embodiments, the rearward portion may extend rearwardly and upwardly with respect to the central portion such that the position of the central portion is generally depressed with respect to the rearward portion. The rearward portion 22 may include a rear frame 56 which may extend rearwardly from the spine 26. The rear frame may include extensions of the spine and the side members of the central portion, with the extended sections being generally at a higher vertical level above the ground surface than the corresponding sections on the central portion.

The rearward portion may also include a rear crossmember 58 which may extend laterally with respect to the trailer and may extending from one side of the trailer to the other, although this is not critical. At least one rear wheel 60 may be mounted on the rear frame and rotatable about a rear wheel axis 62. The rear wheel axis 62 may establish the vertical height of a horizontal plane 63 in which the axis 62 lies. In some of the most preferred embodiments, a pair of laterally spaced rear wheels 60 is employed, with each of the rear wheels being positioned on an opposite side of the rear frame. In some embodiments, each of the rear wheels 60 may be mounted on the frame 56 by a torsion spring assembly 64 that may include a stub axle 66 on which the rear wheel is rotatably mounted and which may extend along the rear wheel axis 62, and a trailing member 68 that is mounted on the rear axle and extends generally rearwardly from the rear axle. The stub axle 66 may be mounted on the trailing member 68 toward a rear end of the trailing member.

The forward portion 24 of the trailer may extend forwardly from the central portion and may be configured to hitch to a towing vehicle. The forward portion may include a neck assembly 70 that extends forwardly from the spine of the central portion, and may provide an extension of the spine. In some embodiments, the neck assembly 70 may include an ascending structure 72 mounted on and extending upwardly from the spine, and a descending structure 74 mounted on the ascending structure and extending downwardly from the ascending structure. The descending structure 74 may have a lower end 75.

The forward portion 24 may also include a tongue assembly 76 that is mounted on the neck assembly 70. The tongue assembly 76 may be swivelable with respect to the neck assembly 70 about a substantially vertical axis. The tongue assembly 76 may extend forwardly from the neck assembly for connection to a towing vehicle. The tongue assembly 76 may include a front axle 78 which may be swivelably mounted on the neck portion, such as at the lower end 75 and may extend along a horizontal axis. The tongue assembly may also include at least one front wheel 80, and preferably a pair of front wheels, mounted on the front axle. The front wheel or wheels rotate about a front wheel axis 82. In some of the most preferred embodiments, the front wheels are also suspended using a torsion spring assembly that may be similar to the assembly 64 employed to suspend the rear wheels. The tongue assembly may also include a tongue member 84 that may be mounted on the front axle 78, or a structure associated with the front axle. The tongue member 84 may be pivotally mounted on the front axle to permit movement of the tongue member in a substantially vertical plane. Illustratively, the tongue member may comprise a beam with a hitching structure located toward the front end of the beam, such as a pintle hitch or a socket for receiving a hitch ball.

In some of the most preferred embodiments of the trailer, the central portion 20 is lowered or depressed in height with respect to the rearward portion and/or the forward portion. In such embodiments, the uppermost surfaces of one of more of the members of the central portion have uppermost surfaces that are positioned at a vertical height above the ground surface that is lower than the rear wheel axis and the horizontal plane 63 in which the axis 62 lies, and in some cases this relationship will also apply to the horizontal plane of the front wheel axis 82. Thus, the uppermost surfaces of the members, whether these surfaces function to support the carried head or not, may be positioned at approximately the same level as, or below, the horizontal axes that form the front and/or rear wheel axes. This relative positioning may maintain a relatively low load height for the support surfaces of the central portion, while allowing the use of relatively larger wheels that are easily and safely towable over roads and highways. In some of the most preferred embodiments, the relative height of the support surfaces lower than the rear wheel axes exists not only when the trailer is being loaded with the head, but is also maintained when the while the trailer is towed on the road, which avoids any need to reconfigure elements of the trailer for loading or for towing, and the trailer is substantially immediately ready for towing as soon as the head is rested on the support surface and adequately secured to the trailer. The complexity and cost of the trailer may be minimized by avoiding the reconfiguration elements between loading and towing configurations.

Embodiments in which the central portion is sufficiently long so that the harvester head fits entirely on the central portion, and does not extend over the forward and rearward portions, permits the members of the central portion to be positioned relatively lower than if the head was also to be supported on the forward and/or rearward portions. By this design, the presence of axles and wheels below the portions of the trailer carrying the harvester head is avoided, and the supporting members may be positioned lower than if those members extended over the axles and wheels. t In some illustrative embodiments, the uppermost support surface of at least one of the members of the central portion is located below the rear wheel axis. For example, the uppermost surface of the spine may be located below the rear wheel axis, and the uppermost surfaces of the lateral members may also be located below the height of the rear wheel axis. In many embodiments, the height of the axis of the rear wheel is in the range of approximately 13.5 inches (approximately 343 mm) to approximately 16.5 inches (approximately 420 mm) above the ground surface. Illustratively, the highest uppermost surface of the members of the central portion may measure approximately 16.5 inches (approximately 420 mm) or less above the ground surface, and in other embodiments may measure approximately 13.5 inches (approximately 343 mm), and in some embodiments may measure approximately 13.3 inches (approximately 338 mm). The uppermost surfaces 50 of the secondary side members of the support tray may also measure approximately 16.5 inches (approximately 420 mm) or less above the ground surface, and in other embodiments may measure approximately 13.5 inches (approximately 343 mm), and in some embodiments may measure approximately 10 inches (approximately 250 mm).

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An implement transporting trailer for supporting a harvesting implement, the trailer having a front and a rear and opposite lateral sides, the trailer comprising:
    a central portion for supporting the harvesting implement, the central portion including a longitudinal spine with an uppermost support surface and a plurality of lateral members mounted on and extending laterally from the spine, each of the lateral members having an uppermost support surface;
    a rearward portion extending rearwardly from the central portion, the rearward portion including a rear frame extending rearwardly from the spine and at least one rear wheel being mounted on the rear frame, the at least one rear wheel rotating about a rear wheel axis;
    a forward portion extending forwardly from the central portion and configured to hitch to a towing vehicle, the forward portion including a neck assembly extending forwardly from the spine of the central portion and a tongue assembly mounted on the neck assembly and being swivelable with respect to the neck assembly, the tongue assembly including at least one front wheel and a tongue member pivotable to permit movement in a substantially vertical plane;
    wherein at least one of the uppermost support surfaces of the members of the central portion is located at a vertical level above a ground surface that is lower than the rear wheel axis when the trailer is towable on the road;
    an auxiliary support bar extending forwardly and rearwardly and having an uppermost support surface, the auxiliary support bar being mounted on at least one of the lateral support members in a manner such that a vertical height of the uppermost support surface above a ground surface below the trailer is adjustable;

wherein the auxiliary support bar is mounted on at least one lateral support member in a manner such that a lateral distance between the uppermost support surface of the support bar and the spine is adjustable.

2. The trailer of claim 1 wherein the spine is positioned generally centrally between the lateral sides of the trailer.

3. The trailer of claim 1 additionally comprising a support tray being positioned laterally to the spine, the support tray being formed by a plurality of secondary side members generally aligned with the spine.

4. The trailer of claim 1 wherein the auxiliary support bar is mounted on at least two of the lateral support members in a manner such that a lateral distance between the uppermost support surface of the support bar and the spine is adjustable.

5. The trailer of claim 1 additionally comprising a pair of forward lateral members positioned on the spine toward the front of the trailer, a pair of rearward lateral members positioned on the spine toward the rear of the trailer, and a pair of central lateral members being positioned between the forward and rearward lateral members.

6. The trailer of claim 1 wherein the rearward portion extends rearwardly and upwardly from the central portion such that the central portion is depressed with respect to the rearward portion.

7. The trailer of claim 1 wherein the rear portion includes a pair of laterally spaced rear wheels, each of the rear wheels being positioned on opposite sides of the rear frame, each of the rear wheels being mounted on the frame by a torsion spring assembly.

8. The trailer of claim 1 wherein the neck assembly includes an ascending structure mounted on and extending upwardly from the spine and a descending structure mounted on the ascending structure and extending downwardly from the ascending structure.

9. The trailer of claim 1 wherein the upper support surface of the spine is located at a vertical level above a ground surface that is lower than the rear wheel axis.

10. The trailer of claim 1 wherein each of the upper support surfaces of the spine and the lateral members of the central portion are located at a vertical level above a ground surface that is lower than the rear wheel axis.

11. The trailer of claim 1 wherein each of the upper support surfaces of the members of the central portion are located at a vertical level above a ground surface that is lower than the rear wheel axis.

12. An implement transporting trailer for supporting a harvesting implement, the trailer having a front and a rear and opposite lateral sides, the trailer comprising:
a central portion for supporting the harvesting implement, the central portion including a longitudinal spine with an uppermost support surface and at least one lateral member mounted on and extending laterally from the spine, each of the lateral members having an uppermost support surface;
a rearward portion including a rear frame extending rearwardly from the central portion, a rear axle, and at least one rear wheel being mounted on the rear frame, the at least one rear wheel rotating about a rear wheel axis;
a forward portion configured to hitch to a towing vehicle, the forward portion including a neck assembly extending forwardly from the central portion and a tongue assembly mounted on the neck assembly and being swivelable with respect to the neck assembly, the tongue assembly including at least one front wheel and a tongue member;
wherein at least one of the uppermost support surfaces of the members of the central portion is maintained at a vertical level above a ground surface that is lower than the rear wheel axis for loading the trailer and for towing the trailer and
wherein the central portion includes an auxiliary support bar extending forwardly and rearwardly and having an uppermost support surface, the auxiliary support bar being mounted on at least one of the lateral support members in a manner such that a lateral distance between the uppermost support surface of the support bar and the spine is adjustable.

13. The trailer of claim 12 wherein the auxiliary support bar is adjustable such that a vertical height of the uppermost support surface is adjustable.

14. The trailer of claim 12 additionally comprising a support tray being positioned laterally to the spine, the support tray being formed by a plurality of secondary side members generally aligned with the spine.

15. The trailer of claim 12 wherein each of the upper support surfaces of the members of the central portion are located at a vertical level above a ground surface that is lower than the rear wheel axis.

16. The trailer of claim 12 wherein the rearward portion extends rearwardly and upwardly from the central portion such that the central portion is depressed with respect to the rearward portion.

17. The trailer of claim 12 wherein the neck assembly includes an ascending structure mounted on and extending upwardly from the spine and a descending structure mounted on the ascending structure and extending downwardly from the ascending structure.

18. An implement transporting trailer for supporting a harvesting implement, the trailer having a front and a rear and opposite lateral sides, the trailer comprising:
a central portion for supporting the harvesting implement, the central portion including a longitudinal spine with an uppermost support surface and a plurality of lateral members mounted on and extending laterally from the spine, each of the lateral members having an uppermost support surface;
a rearward portion extending rearwardly from the central portion, the rearward portion including a rear frame extending rearwardly from the spine and at least one rear wheel being mounted on the rear frame, the at least one rear wheel rotating about a rear wheel axis;
a forward portion extending forwardly from the central portion and configured to hitch to a towing vehicle, the forward portion including a neck assembly extending forwardly from the spine of the central portion and a tongue assembly mounted on the neck assembly and being swivelable with respect to the neck assembly, the tongue assembly including at least one front wheel and a tongue member pivotable to permit movement in a substantially vertical plane;
wherein at least one of the uppermost support surfaces of the members of the central portion is located at a vertical level above a ground surface that is lower than the rear wheel axis when the trailer is towable on the road;
an auxiliary support bar positioned generally parallel to the spine and having an uppermost support surface, the auxiliary support bar being mounted on at least two of the lateral support members in a manner such that a lateral distance between the uppermost support surface of the support bar and the spine is adjustable.

19. The trailer of claim 18 wherein the auxiliary support bar is adjustable such that a vertical height of the uppermost support surface is adjustable.

* * * * *